United States Patent

[11] 3,559,582

[72] Inventor Bohuslav A. Hrzek
Troy, Mich.

[21] Appl. No. 787,477
[22] Filed Dec. 27, 1968
[45] Patented Feb. 2, 1971
[73] Assignee Energy Conversion Devices, Inc.
Troy, Mich.
a corporation of Delaware

[54] SQUIB CONTROL CIRCUIT
8 Claims, 3 Drawing Figs.

[52] U.S. Cl. .......... 102/70.2, 102/18
[51] Int. Cl. .......... F42c 11/00, F42c 11/06, F42c 15/06
[50] Field of Search .......... 102/18, 70.2

[56] References Cited

UNITED STATES PATENTS

| | | | |
|---|---|---|---|
| 3,111,594 | 11/1963 | Stolte .......... | 102/70.2X |
| 3,262,388 | 7/1966 | McCarty .......... | 102/18 |
| 3,316,451 | 4/1967 | Silberman .......... | 102/70.2X |
| 3,424,924 | 1/1969 | Leisinger et al. .......... | 102/70.2 |
| 3,468,255 | 9/1969 | Stryker, Jr. .......... | 102/70.2 |

*Primary Examiner*—Benjamin A. Borchelt
*Assistant Examiner*—Thomas H. Webb
*Attorney*—Wallenstein, Spangenberg, Hattis & Strampel

ABSTRACT: A number of branch circuits is provided each containing a low resistance squib element connected across a pair of voltage input points each of which branch circuits includes a self-resetting, solid state, threshold level responsive switch device which is in a normally high resistance condition and is triggered to a low resistance condition when a voltage applied thereacross exceeds a given threshold voltage value, which low resistance condition persists until the current flowing therethrough drops below a given holding current level. Each squib element will then heat and blow to trigger a given operation and open the branch circuit involved when the current persists therethrough for a given minimum duration. Means for providing a source of voltage pulses is connected across the input points which pulses preferably exceed the threshold voltage values of all of the threshold level responsive switch devices in the branch circuits. The voltage responsive characteristics of the switch devices vary somewhat so only one of the switch devices is triggered into its low resistance condition for each pulse to effect a flow of current for said duration to blow the associated squib element.

Inventor
Bohuslav A. Hrzek
By: Wallenstein, Spangenberg, Hattis & Strampel Attys

SQUIB CONTROL CIRCUIT

This invention relates to the control of squib elements used, for example, to control the firing of rockets or other detonable devices where a number of such devices are to be fired in succession from a common control voltage source.

One of the c objects of the invention is to provide a squib control circuit for successively firing a number of squib elements in accordance with the feeding of control pulses thereto, and which control circuit has substantially greater reliability than the circuits heretofore used for firing such squib elements in succession.

A related object of the invention is to provide a squib control circuit as described which has in series with each squib element a current-controlling device, referred to as a threshold level responsive switch device, which can be rendered conductive when a voltage is applied thereacross which exceeds a given threshold level and which can be readily pretested in the field to determine its operability under the squib firing conditions which actually exist.

In some of the squib control circuits heretofore utilized for operating a number of squib elements in succession, successive operation of the squib elements was not possible following the failure of a squib element to blow as desired. In such case, the squib element which failed to blow loaded the circuit so that subsequent pulses could not blow the other squib elements. Accordingly, another object of the invention is to provide a squib control circuit for operating a number of squib elements in sequence so the failure of a squib element to blow will not adversely affect the ability of the circuit subsequently to properly blow the other squib element in succession.

The most advantageous and preferred form of the invention utilizes a series of parallel branch circuits coupled across an energizing voltage circuit produced a pulsed output superimposed on a steady DC voltage, each branch circuit including a squib element in series with a switch device which is most preferably a threshold switch device of the kind disclosed and claimed in U.S. Pat. No. 3,271,591 on Sept. 6, 1966 to S.R. Ovshinsky. In this patent, these threshold switch devices are referred to as "Mechanism" devices. These devices most advantageously comprise films or layers of semiconductor material applied by vacuum deposition, sputtering or screening on any conductive electrode-forming layer carried on a suitable base of insulating material. The threshold switch devices and other associated circuit elements except necessarily discrete devices like the squib elements and voltage sources may be similarly deposited by screening or otherwise on a common base of insulation material.

The threshold switch device is a two-terminal device which switches from a normally high resistance to a low resistance or conducting condition when the applied voltage exceeds some threshold voltage value, and reverts to the high resistance condition when the current flow therethrough falls below some minimum holding current value. While for purposes of illustration, reference is made to switch devices of the type disclosed in U.S. Pat. No. 3,271,591, other switch devices having these characteristics may be utilized in accordance with the broadest aspect of this invention. Thus, although a little practical value, neon lamps and four- or five-layer diodes are theoretically useful as switch devices in the squib control circuit being described. However, these devices are discrete devices or they require special substrates, as in the case of integrated circuit-type semiconductor diodes, so that they cannot be fabricated by film deposition on almost any base like the film-type semiconductor threshold switch devices disclosed in said U.S. Pat. No. 3,271,591. Furthermore, unlike neon lamps and said four- and five-layered diodes, these film threshold switch devices can be fabricated with a wide selection of threshold levels of modest values (e.g., 5—30v. merely by controlling the thickness of the films.

An energizing voltage circuit is provided which most advantageously includes a source of DC voltage for supplying the current necessary to blow each squib element once the associated threshold device has been triggered from its high resistance to its low resistance or conducting condition. The output of the source DC voltage is preferably substantially less than the threshold voltage value of the various threshold switch devices. An isolating rectifier is inserted in the connection between one of the terminals of the source DC voltage and one of the input lines leading to the parallel branch circuits. A capacitor is preferably connected between this input line and one of the output terminals of a source of pulses of a given polarity whose opposite output terminal is connected to the other input line to the parallel branch circuits. Between pulses, the capacitor charges up to the output of the source of DC voltage and each pulse generated by the source of pulses adds to the voltage across the capacitor to provide a resultant voltage which exceeds the threshold voltage value of the various threshold switch devices in the various branch circuits. Most of this resultant voltage appears across the terminals of the threshold switch devices in each branch circuit because the resistance of the associated squib elements is insignificant relative to the high resistance value of the threshold switch devices. Since it is practically in impossible to construct threshold switch devices with identical threshold voltage values and delay characteristics (the time it takes a threshold switch device to begin to respond to the application of a switching voltage), one of the threshold switch devices will fire prior to the other devices and, as soon as this occurs, the voltage across the aforementioned input lines will immediately decay as the capacitor referred to discharges and recharges to the new voltage conditions of the circuit. It is important where the threshold switch devices have approximately the same threshold voltage value that the transition time of the device (the time it takes the device to switch from its high to its low resistance condition following the delay time) be many orders (e.g. 1,000 or more times) faster than the delay time (e.g. $10^{-9}$ seconds verses $10^{-6}$ seconds) to avoid triggering more than one threshold wit switch device at a time. The threshold switch devices of said U.S. Pat. No. 3,271,591 satisfy this requirement, whereas most if not all other available prior types of threshold switch devices do not satisfy this requirement. In any event, the time constant of, and the value of the voltage in, the circuit are selected so that, upon the triggering of a threshold switch device in a branch circuit to its low resistance conducting condition, the voltage across the threshold switch devices in the other branch circuits will drop below the threshold voltage values thereof before they can respond to the initial voltage applied thereto even when such initial voltage exceeds the threshold voltage values thereof.

To enable each successive pulse to effect the blowing of another squib element in the circuit described, it is necessary that each previous squib blowing operation which initially results in the conduction of a threshold switch device in a branch circuit terminates in the opening of the branch circuit as by the blowing of the associated fuse. Otherwise, the source of DC voltage will continue to supply a holding current for the threshold switch device involved and a voltage for triggering another threshold switch a device involved and a voltage for triggering another threshold wh switch device in another branch circuit cannot be developed across the input lines referred to. To prevent the failure of the blowing of a squib element from rendering the circuit inoperative, the threshold switch devices are designed to act as overload fuses which blow if current continues to flow therethrough for substantially a greater period than that necessary normally to blow the squib element. In such case, the destruction of the threshold switch device involved will open the associated branch circuit and permit the circuit to operate normally when a subsequent pulse is generated by the source of pulses.

The above and other objects and features of this invention will become apparent upon making reference to the specification to follow, the claims and the drawings wherein:

Figure 1:
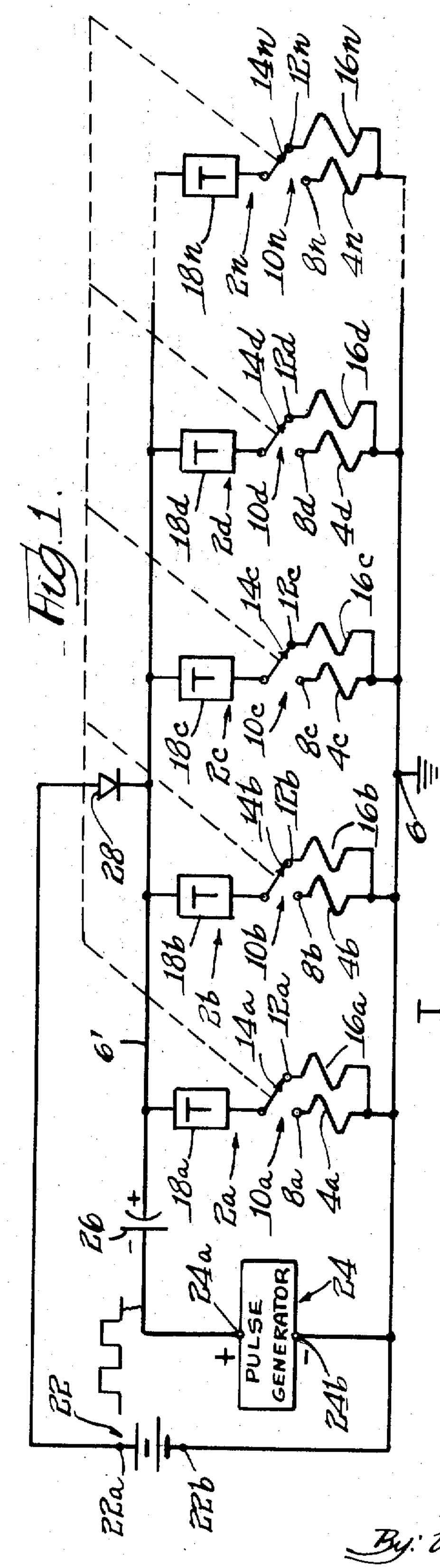
FIG. 1 is a circuit diagram of the most advantageous form of the invention.

As shown in FIG. 1, the circuit includes a number of parallel branch circuits identified respectively by reference characters 2a, 2b, 2c, 2d... 2n. The branch circuits have respective squib elements 4a, 4b, 4c, 4d... 4n each of which is a relatively expensive fuse element which, when current of a given value flows therethrough, will heat up and blow to open the branch circuit involved. The blowing of a fuse element may initiate the detonation of a rocket or other detonatable device.

In the most preferred circuit illustrated, each of the squib elements is connected between a common illustrated, each of the squib elements is connected between a common ground line 6 and a stationary contact 8a, 8b, 8c, 8d... or 8n of a manually operable single pole, double-throw switch 10a, 10b, 10c, 10d... or 10n. Each of these single pole, double-throw switches further has a stationary contact 12a, 12b, 12c, 12d... or 12n and a movable pole or wiper 14a, 14b, 14c, 14d... or 14n. A relatively inexpensive test fuse element 16a, 16b, 16c, 16d... or 16n is connected respectively between the stationary contact 12a, 12b, 12c, 12d... or 12n and the grounded line 6. The movable poles or wipers 14a, 14b, 14c, 14d... and 14n for the various branch circuits are connected respectively to one of the terminals of threshold switch devices 18a, 18b, 18c, 18d... and 18n, which may be the aforementioned threshold switch devices disclosed in said U.S. Pat. No. 3,271,591. The other terminals of the threshold switch devices referred to are connected to an input line 6'. The movable poles 14a, 14b, 14c, 14d... 14n are ganged together for simultaneous operation.

The fuse elements 16a, 16b, 16c, 16d... and 16n and the squib elements 4a, 4b, 4c, 4d... and 4n blow when a current exceeding a given value flows therethrough for a certain minimum period. This current flows in one of these elements when the associated threshold switch device 18a, 18b, 18c, 18d... or 18n is triggered to a low resistance conducting condition. The manually operable switches 10a, 10b, 10c, 10d... and 10n are for the purpose of selectively connecting the associated fuse or squib elements to the associated threshold switch devices. Before the actual firing of the detonable devices involved, the various manually operable switches 10a, 10b, 10c, 10d... and 10n are operated to connect the associated test fuse elements 16a, 16b, 16d... and 16n with the associated threshold switch devices to check the operability of the threshold switch devices under actual field-operating conditions. When the operation of all the threshold switch devices have been checked out by noting that all of the test fuse elements have been blown, the squib control circuit is armed by the operation of the manually operable switches to connect the threshold level responsive switch devices to the associated squib elements.

Figure 2:
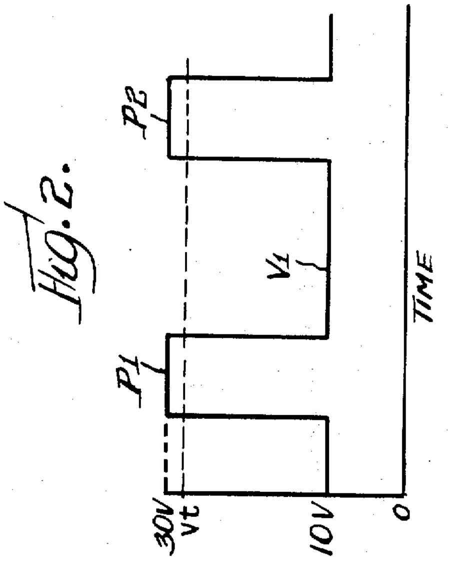
FIG. 2 shows the applied voltage waveform for the circuit of FIG. 1.

Means are provided for generating successive squib or fuse-blowing initiating voltage pulses across the lines 6–6' extending to the various aforementioned branch circuits. Such means, which may take a variety of forms, provides a pulses across the lines 6–6' each of which has a magnitude exceeding the threshold voltage value of one or more of the threshold switch device 18a, 18b, 18c, 18d... 18n. It is most advantageous that the squib elements in the various branch circuits be substantially identical and that the threshold voltage values of the various threshold switch devices be substantially identical. (As a practical matter, it is impossible to make identical the threshold voltage values of, or the time it takes the devices to respond to the applied voltage, sometimes referred to as a delay period.) This means for generating squib or fuse-blowing initiating voltage pulses may be a voltage generating circuit capable of supplying pulses for a duration and at the power level required to blow the various squib or fuse elements. However, to provide a circuit capable of operating at the highest pulse repetition rate and for maximum reliability the squib-blowing initiating voltage pulse generating means preferably comprises a source of steady DC voltage 22 and a pulse generator circuit 24 whose outputs are superimposed in the manner to be explained and shown in FIG. 2, where a series of pulses P1 and P2 are superimposed upon a fixed voltage level V1. In FIG. 2, pulses P1 and P2 have a base to peak amplitude of pulse 20 v. and the voltage level V1 is plus 10v.

A capacitor 26 is connected between one of the terminals 24a of the pulse generator circuit 24 and the input line 6', the opposite terminal 24b of the pulse generator circuit 24 being connected to the ground line 6. An isolating rectifier 28 is connected between one of the terminals 22a of the source of DC voltage 22 and the input line 6'. The other terminal 22b of the source of DC voltage is connected to the go ground line 6. In the exemplary circuit being described, the rectifier 28 is oriented so that the voltage applied therethrough to the input line 6' is positive with respect to the voltage on the go ground line 6. If the threshold switch devices 18a, 18b, 18c, 18d... or 18n disclosed in the aforementioned patent are utilized, the circuit will operate without changing the connections of the threshold switch device if the input line 6' is positive or negative with respect to the ground line 6. However, the isolating rectifier 28 must be properly oriented to pass the voltage on the terminal 22a of the source of DC voltage to the input line 6'. Also, the pulse generator circuit 24 must generate pulse of a polarity which will add to the voltage applied across the capacitor 26 from the source of DC voltage 22 in a manner to be explained.

For purpose of explaining the operation of the preferred circuit shown in FIG. 1, it will be assumed that the pulse generator circuit 24 produces pulses varying from 0 v. to plus 20 v., and that between pulses the pulse generator circuit 24 forms a low impedance path for effecting charging of the capacitor 26 from the source of DC voltage 22 through the isolating rectifier 28. Thus, capacitor 26 will charge up to the output of the source of DC voltage 22, which is assumed to be 10 v. (The plates of the capacitor 26 have been given polarity markings in FIG. 1 to show the direction in which the capacitor 26 is charged between generator generation of the pulses by the pulse generator circuit 24.) When the pulse generator circuit 24 generates a 20 v. voltage pulse, this pulse adds to the voltage across the capacitor 26 to produce 30 v. on the input line 6'. It will be assumed that the threshold voltage value of the various threshold switch devices 18a, 18b, 18c, 18d... 18n is slightly under 30 v. and that the normal high resistance value of these devices is many orders greater than the resistance of the squib element 4a, 4b, 4c, 4d... or 4n and the fuse element 16a, 16b, 16c, 16d... or 16n. Consequently, any voltage applied across the lines 6 and 6' is substantially applied across the terminals of the threshold level responsive switch devices. When a threshold level responsive switch device is triggered to its low resistance condition, the switch acts as a substantial short circuit path for flow current to the squib or fuse element connected in the branch circuit at the time. Because of slight differences in the characteristics of the various threshold switch devices, when 30 v. is applied across the lines 6–6' only one of the devices will be triggered to its low resistance condition. When this occurs, the capacitor 26 will suddenly discharge and then recharge to the magnitude of the voltage pulse generated by the voltage generator circuit 24. This will substantially instantaneously reduce the voltage cross the lines 6–6' to a value below the threshold voltage values of the other threshold switch devices so the latter will not be triggered into the low resistance condition. As soon as a threshold.s switch device 2a is triggered into its low resistance condition, current is supplied from the source of DC voltage 22 through the rectifier 28 to the associated squib or fuse element connected into the branch circuit involved, and, after a short delay period, the squib or fuse element will blow thereby opening the branch circuit involved. When a fuse of or squib element blows, current stops flowing in the branch circuit involved and the associated threshold switch device will reset itself to a normal high resistance condition. It is assumed that by the time the fuse or squib element blows, the pulse generated by the pulse generator circuit 24 involved will have disappeared, although this is not absolutely necessary for proper operation of the circuit. As previously indicated, once such pulse terminates, the capacitor 26 will again charge up to the output of the source of DC voltage 22 through a rather short time constant circuit, so that the circuit is immediately ready to receive another pulse for initiating another fuse or squib element blowing operation. It a is apparent that successive application of pulse to the lie lines 6–6′ will ultimately blow all the fuse or squib elements in the various branch circuits.

Figure 3:
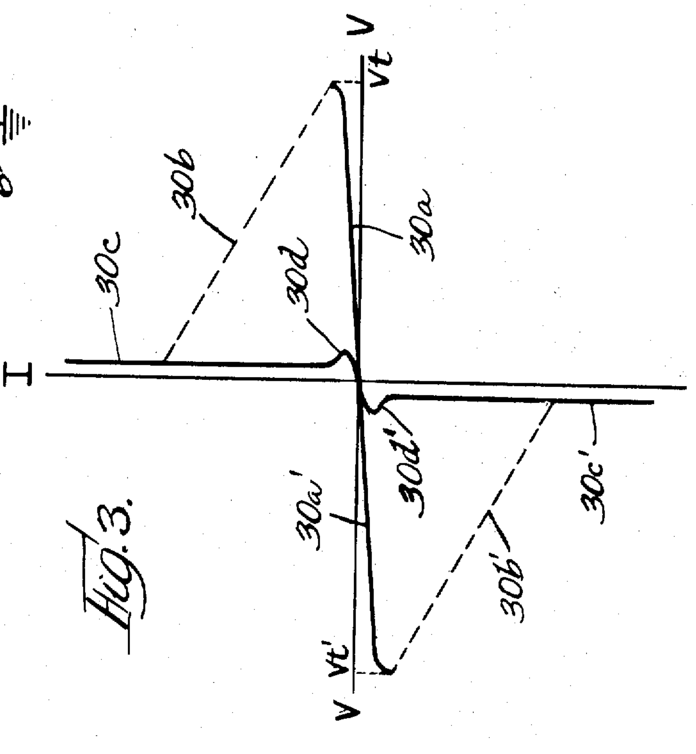
FIG. 3 shows the current-voltage characteristic of the threshold switch devices in FIG. 1.

FIG. 3 is an I—V curve illustrating the DC operation of the threshold switch devices 18*a*, 18*b*, 18*c*, 18*d*... 18*n*. As previously indicated, each of these devices is normally in a high resistance condition and, as the DC voltage applied to the terminals thereof is increased from 0, the voltage-current characteristics of the device is illustrated by the curve portions 30*a* and 30*a′* for voltages of opposite polarity, the electrical resistance of the device then being high and substantially blocking the current flow therethrough. When the voltage is increased to the threshold voltage value $V_t$ or $V_t'$ thereof, the high electrical resistance of the device substantially instantaneously decreases in at least one path in the semiconductor material between the terminals thereof, the substantially instantaneous switching being indicated by the curve portions 30*b* and 30*b′* thereof. This provides a low electrical resistance or conducting condition for conducting current therethrough. The low electrical resistance is many orders of magnitude less than the high electrical resistance. The conducting condition is illustrated by the curve portion 30*c* and 30*c′*. In the low resistance current conducting condition the device has a voltage drop in the high resistance blocking condition near the threshold value $V_t$ or $V_t'$.

As the voltage is decreased, the current decreases along the curve portion 30*c* or 20*c′*, and, when the current decreases below a minimum current holding value, the low electrical resistance of said at least one path immediately returns to the high electrical resistance as illustrated by the curve portion 30*d* and 30*d′* to reestablish the high resistance blocking condition. In other words, a current is required to maintain the threshold switch device in its conducting condition and when the current falls below a minimum current holding value, the low electrical resistance immediately returns to the high electrical resistance. It should be observed that the threshold switch devices are each symmetrical in its operation, it blocking current substantially equally in each direction for a given voltage and it conducting current substantially equally in each direction for a given voltage, and the switching between the blocking and conducting conditions being extremely rapid.

A typical value for the high electrical resistance of a threshold switch device disclosed in the aforesaid patent may be about 1 megohm; a typical value for the low electrical resistance thereof of about 10 ohms; a typical threshold voltage value thereof may be about 25—30 v. and the voltage drop thereacross in the conducting condition thereof is usually 1.5 v. or less; and the response time thereof (i.e. delay time plus the transition time) is typically several hundred nanoseconds. There is substantial change in phase or physical structure of the aforesaid threshold switch device as it is switched between the blocking and conducting conditions, and, where the semiconductor material is substantially disordered and generally amorphous, said at least one conducting path through the semiconductor material is also substantially disordered and generally amorphous in the conducting condition. Where the semiconductor material is substantially more ordered and generally crystalline or polycrystalline, in the manner of having local chemical bonds similar to those of the substantially disordered and generally amorphous semiconductor material, neither is there and any substantial change in phase or crystal structure.

It should be understood that numerous modifications may be made in the most preferred form of the invention described above without deviating from the broader aspects thereof.

I claim:

1. In a squib control circuit comprising a number of branch circuits connected in parallel across a pair of voltage input points, each branch circuit including a squib element which, when a given current is fed therethrough for a given duration, heats and blows to trigger a given operation and open the branch circuit involved, and energizing circuit means for providing successive squib-blowing initiating voltage pulses each of which initiates the flow of said given current for at least said given duration to effect the blowing of a squib element in a different branch circuit when there is a low resistance path presenting a low resistance between said input points and the squib element involved, the improvement comprising: a separate self-resetting, solid state threshold level responsive switch device connected in series with the squib element of each branch circuit, each of said threshold level responsive switch devices having a pair of terminals across which the device normally presents a resistance many orders greater than said low resistance to provide a blocking condition for substantially blocking current through the associated squib element, and wherein said high resistance in response to a voltage applied across said pair of terminals thereof above a given threshold voltage value for a given period substantially instantaneously decreases to said low resistance to provide a conducting condition for substantially conducting current therethrough, which low resistance condition persists until the current flowing therethrough drops below a given holding current level, each squib-blowing initiating voltage pulse having a magnitude above said given threshold voltage value of the threshold level responsive switch device associated with the squib element to be blown thereby and effecting the application of a voltage pulse across the terminals of said threshold level responsive switch device whose magnitude is above the threshold voltage value thereof, and each of said threshold level responsive switch devices being responsive to the flow therethrough of a squib-blowing current for a substantially greater period than said given duration by destroying itself to open the circuit to the associated squib element should the latter fail to blow, so subsequent squib-blowing voltage pulses can trigger the other threshold switch devices in succession.

2. The squib control circuit of claim 1 wherein each of said threshold level responsive switch devices is located in the branch circuit with the associated squib element, wherein each voltage pulse applied across said input points is similarly applied across the switch devices of the branch circuits associated with still unblown squib elements and exceeds the threshold voltage values thereof, the voltage response characteristics of the various threshold switch devices being nonidentical wherein one will be triggered into its low resistance state before the others, such triggering instantaneously reducing the voltage applied across any other such device below the threshold voltage value thereof, so only one threshold switch device can be triggered by a given pulse.

3. The squib control of claim 1 wherein each of said threshold level responsive switch device is located in the branch circuit with the associated squib element, wherein each voltage pulse applied across said input points is similarly applied across the switch devices of the branch circuits associated and still unblown squib elements, the voltage response of the various threshold switch devices being nonidentical wherein one will be triggered into its low resistance state before the others, the voltage pulse occurring across said input points and the voltage characteristics of said threshold level responsive switch devices permitting only one threshold switch device to be triggered by a given pulse.

4. In a squib control circuit comprising a number of branch circuits connected in parallels across a pair of voltage input points, each branch circuit including a squib element which, when given current is fed therethrough for a given duration, heats and blows to trigger a given operation and opens the branch circuit involved, an energizing circuit means for providing successive squib-blowing initiating voltage pulses each of which initiates the flow of said given current for at least a given duration to effect the blowing of a squib element in a different branch circuit when there is a path of low resistance between said input points and the squib element involved, the improvement comprising: a separate, self-resetting, solid state, threshold level responsive device connected in each of said branch circuits in series with the associated squib element, wherein each voltage pulse appearing across said input points is similarly applied across each branch circuit, each of said threshold level responsive switch devices having a pair of terminals across which the device normally presents a high resistance many orders greater than said low resistance to provide a blocking condition for substantially blocking current through the associated squib device and wherein said high resistance in response to a voltage applied across said terminals thereof above a given threshold value for a given period substantially instantaneously decreases to said low resistance to provide a conducting condition for substantially conducting current therethrough which low resistance condition persists until the current flowing therethrough drops below a given holding current level, each squib-blowing initiating voltage pulse having a magnitude above said given threshold voltage value of the threshold voltage value of the threshold switch device associated with the squib element to be blown thereby and effecting the application of a voltage pulse across the terminals of said threshold switch device whose magnitude is above said threshold voltage value thereof, the voltage response characteristics of the various threshold level responsive switch devices in said branch circuits being nonidentical, wherein one will be triggered into its low resistance conducting condition before the other untriggered devices and none of the other untriggered devices will be triggered into its low resistance conducting condition until the application of the next voltage pulse across said input points.

5. The squib control circuit of claim 4 wherein each voltage pulse applied across said input points exceeds the threshold voltage values of all the threshold level responsive switch devices, but only one will be triggered into its low resistance state before the other devices still in a high resistance blocking condition, such triggering instantaneously reducing the voltage applied across any other such device below the threshold voltage value thereof before it is triggered into such condition, so only one threshold switch device can be triggered by a given pulse.

6. The squib control circuit of claim 4 where there is provided a test circuit for testing the operation of said threshold level responsive switch devices in the squib control circuit, said test circuit including a series of test fuse elements which will blow if substituted for said squib element in said branch circuits under the aforesaid voltage and current conditions, and switch means for selectively connecting said squib elements or said test fuse elements into said branch circuits.

7. The squib control circuit of claim 4 wherein said energizing circuit means includes a source of DC voltage for supplying the current to blow said squib elements, the output of said source of DC voltage being substantially less than said threshold voltage values of said threshold switch devices, rectifier means, means connecting said source of DC voltage and said rectifier means in series across said input points, a source of voltage pulses which at least when added to the output of said source of DC voltage produces a resultant voltage which will apply across at least one threshold level responsive switch device in series with an unblown squib element a voltage which exceeds said threshold voltage value thereof for a period to trigger the same, a capacitor, means connecting said source of voltage pulses and said capacitor in series between said input points so said capacitor will charge to the output of said source of DC voltage between successive pulses and will relatively quickly charge up to the value of the applied pulses when a threshold level responsive switch device in a branch circuit is initially triggered to its low resistance condition prior to the blowing of the associated squib element, so the voltage across said input points drops below the value which will trigger the other threshold level responsive switch devices as soon as the first device triggered by a given pulse into its low resistance condition is so triggered.

8. The squib control circuit of claim 5 wherein the threshold switch devices in all of the branch circuits have approximately the same threshold voltage values, the time it takes for each threshold switch device to begin response to a squib-blowing initiating pulse, namely the delay time thereof, being different for the various devices, and the time it takes each threshold switch device to switch from its high to its low resistance condition once it begins to respond to a squib-blowing initiating pulse being many orders faster than said delay time thereof.